United States Patent Office 3,153,929
Patented Oct. 27, 1964

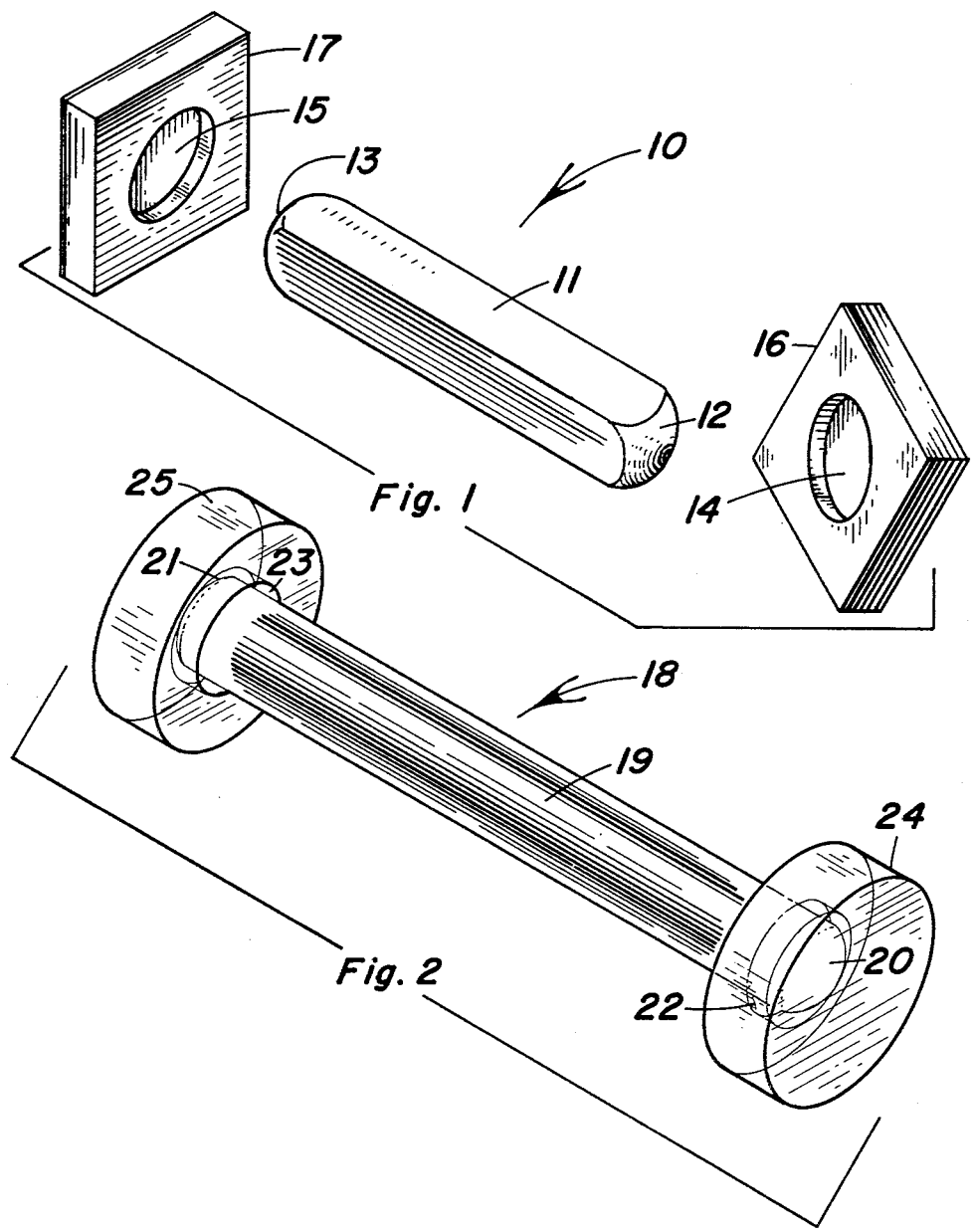

3,153,929
ELASTOMERIC TEST SPECIMEN
John B. Baldwin, San Jose, Calif., assignor to Thiokol Chemical Corporation, Bristol, Pa., a corporation of Delaware
Filed June 22, 1962, Ser. No. 204,566
3 Claims. (Cl. 73—103)

This invention relates to the physical property testing of elastomeric materials and, more particularly, to an elastomeric test specimen.

One of the most difficult problems encountered in the testing of elastomeric materials is the simple and economical fabrication of a tensile test specimen which will have an essentially uniform strain field during testing, is substantially free from distortion due to its configuration or method of retention, and which requires no extensive or complicated associated equipment when being tested.

Test specimens similar to, or derived from, those employed with non-elastomeric materials have been used with elastomeric materials, despite their many faults, because of their relative simplicity. For example, bars of elastomeric material of circular or square cross-section have been used in substantially the same manner as similar bars of metal, which are held in some type of clamp or vise. However, when elastomers are clamped in compression jaws such as are used for metal, the specimen is seriously distorted and erroneous test values result.

This problem of clamping distortion may be partially alleviated, but not eliminated, by increasing the cross-sectional area of the part of the specimen held in the jaws. Clamping distortion may also be substantially reduced by making the width of the enlarged section greater than the thickness, and retaining the specimen without clamping in jaws internally contoured to closely match the external contour of the enlarged section. This is the configuration of the well-known JANAF test specimen.

Even with clamping distortion reduced, another problem remains; and this problem is aggravated by enlarging part of the specimen to reduce clamping distortion. As the specimen is strained, it undergoes elastic deformation, and this deformation causes part of the enlarged or clamped section of the specimen to flow or be extruded from the retaining jaws. This flow distorts the strain field in the specimen, and also increases the gauge length, or base length of specimen subject to strain. Test specimens and test techniques have been developed which reduce or compensate for the effects of flow, but the effects can not be entirely eliminated so long as part of the specimen is enlarged.

It is therefore an object of this invention to provide an elastomeric test specimen having an essentially uniform strain field. It is another object of this invention to provide an elastomeric test specimen substantially free from distortion during use. It is a further object of this invention to provide an elastomeric test specimen and a method of making the same that is simple and economical.

In general, the objects of this invention may be attained by adhesively bonding a bar of elastomeric material having spherically rounded ends to a pair of relatively non-elastomeric plates. A square cross-section is preferred for the bar of elastomeric material, but a circular cross-section may be used to advantage with certain types of elastomeric material. Preferred configurations for the plates to which the bar is adhesively bonded are square or circular, but other configurations consistent with the requirements of the equipment to be used in testing the elastomeric specimen may be employed. It is essential that both the plates and the adhesive used in bonding the bar of elastomeric material to the plates be substantially more rigid than the elastomeric material composing the bar.

Referring now to the drawing:
FIGURE 1 is an exploded perspective view of one embodiment of the present invention prior to assembly, and
FIGURE 2 is a perspective view of another embodiment of the invention as assembled.

In FIGURE 1, there is shown an elastomeric test specimen 10 which includes a bar of elastomeric material 11 of square cross-section having spherically rounded ends 12 and 13. The rounded ends 12 and 13 are to be adhesively bonded into cylindrical cavities 14 and 15 of a pair of square plates 16 and 17. An amine-epoxide adhesive, or other suitable adhesive of high rigidity, is to be used in forming the bond.

In FIGURE 2, there is shown an elastomeric test specimen 18 which includes a bar of elastomeric material 19 of circular cross-section having spherically rounded ends 20 and 21 adhesively bonded into cylindrical cavities 22 and 23 of a pair of circular plates 24 and 25. In this embodiment, the circular plates 24 and 25 are of a relatively rigid, transparent material such as polymethylmethacrylate.

The bar of elastomeric material may be formed in any of a number of ways, depending upon the material. The bar may be cast, extruded, or cut from a larger mass of material. Bars of square cross-section cut from blocks or slabs are generally preferred as being more uniform. Cast or extruded bars of circular cross-section may be advantageously used when the nature of the elastomeric material is such that bars of square cross-section can not readily be prepared.

Regardless of the cross-sectional configuration of the bar used, the ends of the bar must be rounded. The ends of the bar are sanded, ground, or machined to form sections of spherical surfaces with radii approximately twice the thickness of the bar. If a filler material is used, a small amount may be removed from the rounded ends by means of a blotting paper or similar material moistened with a suitable solvent.

The prepared bar of elastomeric material is then adhesively bonded to a pair of plates. This may be done in one step, or in two, depending upon the adhesive used and the nature of the elastomeric material. In the illustrative embodiments shown in the drawing, cylindrical cavities are provided in the plates to aid in performing this operation. If such plates are used and they are to be bonded to the bar one at a time, the bar is suspended perpendicularly above the plate with its end in the cavity and the cavity is filled with adhesive. When the adhesive has cured, the bar is inverted above the second plate and bonded in a like manner.

While the present invention has been described by means of specific examples and in specific embodiments, it should not be limited thereto, for obvious modifications will occur to those skilled in the art without departing from the spirit of the invention or the scope of the subjoined claims.

What is claimed is:

1. An elastomeric test specimen, comprising an elongated bar of elastomeric material having an essentially constant cross-sectional area and ends partially spherically rounded, adhesively bonded to a pair of plates by a fillet of adhesive between the surfaces of said rounded ends and said plates, both said plates and the adhesive used being substantially more rigid than said elastomeric material.

2. An elastomeric test specimen, comprising an elongated bar of elastomeric material having an essentially constant square cross-sectional area and ends partially spherically rounded adhesively bonded to a pair of plates by a fillet of adhesive between the surfaces of said rounded ends and said plates, both said plates and the adhesive used being substantially more rigid than said elastomeric material.

3. An elastomeric test specimen, comprising an elongated bar of elastomeric material having an essentially constant circular cross-section and ends partially spherically rounded, adhesively bonded to a pair of plates by a fillet of adhesive between the surfaces of said rounded ends and said plates, both said plates and the adhesive used being substantially more rigid than said elastomeric material.

References Cited in the file of this patent

UNITED STATES PATENTS 2,608,857    La Torre et al. _____ Sept. 2, 1952

FOREIGN PATENTS 715,261    Germany _____ Dec. 18, 1941